US010566024B2

(12) United States Patent
Hasegawa et al.

(10) Patent No.: US 10,566,024 B2
(45) Date of Patent: Feb. 18, 2020

(54) MOVING CARTRIDGES WITHIN A SHUTTLE COMPLEX

(71) Applicant: INTERNATIONAL BUSINESS MACHINES CORPORATION, Armonk, NY (US)

(72) Inventors: Tohru Hasegawa, Tokyo (JP); Yuhko Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/179,232

(22) Filed: Nov. 2, 2018

(65) Prior Publication Data

US 2019/0074033 A1 Mar. 7, 2019

Related U.S. Application Data

(62) Division of application No. 15/358,490, filed on Nov. 22, 2016, now Pat. No. 10,170,147.

(51) Int. Cl.
*G11B 15/675* (2006.01)
*G11B 15/68* (2006.01)
*G11B 27/10* (2006.01)
*G11B 17/22* (2006.01)

(52) U.S. Cl.
CPC ........ *G11B 15/689* (2013.01); *G11B 15/6835* (2013.01); *G11B 27/10* (2013.01); *G11B 17/228* (2013.01)

(58) Field of Classification Search
CPC .. G11B 15/6835; G11B 15/689; G11B 17/228
USPC ............................................. 360/92.1, 98.05
See application file for complete search history.

(56) References Cited

U.S. PATENT DOCUMENTS

| | | | |
|---|---|---|---|
| 5,654,839 A | 8/1997 | Tanaka et al. | |
| 6,094,322 A * | 7/2000 | Nakagomi | G11B 15/688 360/92.1 |
| 6,409,450 B1 * | 6/2002 | Ostwald | G11B 15/6825 360/92.1 |

(Continued)

OTHER PUBLICATIONS

IBM United States Hardware Announcement, "IBM System Storage TS3500 Tape Library Connector and TS1140 Tape Drive support for the IBM TS3500 Tape Library," May 9, 2011.

(Continued)

*Primary Examiner* — Jefferson A Evans
(74) *Attorney, Agent, or Firm* — ZIP Group PLLC

(57) ABSTRACT

The present description is directed to moving a cartridge including a storage medium within a shuttle complex that includes numerous shuttle connections, and a plurality of library strings connected by at least one shuttle connection. Each shuttle connection has a car able to move within the shuttle connection and each library string has at least one cartridge including a storage medium. The shuttle complex identifies a library string that contains the access-cartridge (LSAC), identifies whether there is a drive within the LSAC that has a second cartridge mounted therein which comprises only inactive data chunks, removes the second cartridge from the drive within the LSAC if an elapsed time since the drive within the LSAC most recently accessed the second cartridge exceeds a predetermined time period threshold, and mounts the access-cartridge to the drive within the LSAC.

6 Claims, 6 Drawing Sheets

(56) References Cited

U.S. PATENT DOCUMENTS

| | | | |
|---|---|---|---|
| 7,637,707 B2 * | 12/2009 | Perlov | H01L 21/67167 |
| | | | 414/217.1 |
| 7,788,413 B1 | 8/2010 | Justiss et al. | |
| 8,321,379 B2 | 11/2012 | Chang et al. | |
| 8,781,621 B2 | 7/2014 | Hirata et al. | |
| 8,838,872 B2 | 9/2014 | Starr | |
| 8,868,866 B2 | 10/2014 | Hoelsaeter | |
| 9,256,370 B2 | 2/2016 | Hasegawa et al. | |
| 10,037,151 B2 | 7/2018 | Kim et al. | |
| 2004/0264308 A1 | 12/2004 | Crighton et al. | |
| 2010/0265606 A1 * | 10/2010 | Thompson | G11B 5/86 |
| | | | 360/15 |
| 2013/0044386 A1 * | 2/2013 | Sato | G11B 23/042 |
| | | | 360/15 |
| 2013/0101373 A1 | 4/2013 | Starr et al. | |
| 2013/0325167 A1 | 12/2013 | Prigge et al. | |
| 2014/0016227 A1 | 1/2014 | Morrison et al. | |
| 2014/0030049 A1 | 1/2014 | Imai et al. | |
| 2014/0031973 A1 | 1/2014 | Hirata et al. | |
| 2014/0142742 A1 | 5/2014 | Hasegawa et al. | |
| 2015/0012716 A1 * | 1/2015 | Uchiyama | G11B 27/002 |
| | | | 711/154 |
| 2015/0032251 A1 | 1/2015 | Hasegawa et al. | |
| 2015/0050106 A1 | 2/2015 | Thompson et al. | |
| 2015/0347028 A1 | 12/2015 | Kotte et al. | |
| 2016/0154595 A1 * | 6/2016 | Hayashi | G06F 3/0617 |
| | | | 711/114 |
| 2018/0067658 A1 * | 3/2018 | Tripathy | G06F 3/0611 |

OTHER PUBLICATIONS

Iliadis, I., et al., "Performance Evaluation of a Tape Library System," Research Report, May 25, 2016.

IBM Disclosure Bulletin vol. 37, Issue No. 2B, pp. 439-444, Feb. 1994.

* cited by examiner

MOVING CARTRIDGES WITHIN A SHUTTLE COMPLEX

TECHNICAL FIELD

Embodiments of the present invention relate to moving cartridges within a shuttle complex.

BACKGROUND ART

A shuttle complex has been proposed for libraries in which a plurality of library strings connecting a plurality of libraries with storage media such as tapes are arranged in rows, and the library strings are connected by shuttle connections. This shuttle complex is already in practical use (IBM System Storage TS3500, etc.). In this shuttle complex, cars able to move within a shuttle connection move cartridges including storage media such as tapes between library strings, and the cartridges are mounted in a drive or stored in a slot within the library frame specified as the destination point.

In methods of the prior art for moving cartridges between library strings, when there is no car in the library string at the departure point, an available (empty) car has to be moved from the closest library string before the cartridge can be loaded into the car and moved to the library string at the destination point. Therefore, the time required to move cartridges between library strings is extended to include the movement of empty cars, and the amount of time required to move empty cars increases as both the traveling distances of cartridges and the number of traveling runs increases.

SUMMARY OF THE DESCRIPTION

In an embodiment of the present description, a system is presented. The system includes a shuttle complex. The shuttle complex includes a plurality of shuttle connections and a plurality of library strings connected by at least one shuttle connection. Each shuttle connection has a car able to move within the shuttle connection and each library string includes at least one cartridge that includes a storage medium. The system further includes a library string that includes an access-cartridge (LSAC). The system further includes a local drive amongst a plurality of local drives within the LSAC that has a second cartridge mounted therein which includes only inactive data chunks. The system further includes a first robotic arm within the LSAC that removes the second cartridge from the local drive within the LSAC and mounts the access-cartridge to the local drive within the LSAC, if an elapsed time since the local drive within the LSAC most recently accessed the second cartridge exceeds a predetermined time period threshold. The system further includes an LSR-LSAC shuttle connection that moves the access-cartridge from the LSAC to a remote library string that includes a remove drive (LSR), if the elapsed time since the local drive within the LSAC most recently accessed the second cartridge does not exceed the predetermined time period threshold. The system further includes a second robotic arm within the LSR that mounts the access-cartridge to the remote drive within the LSR.

DETAILED DESCRIPTION

Figure 1:
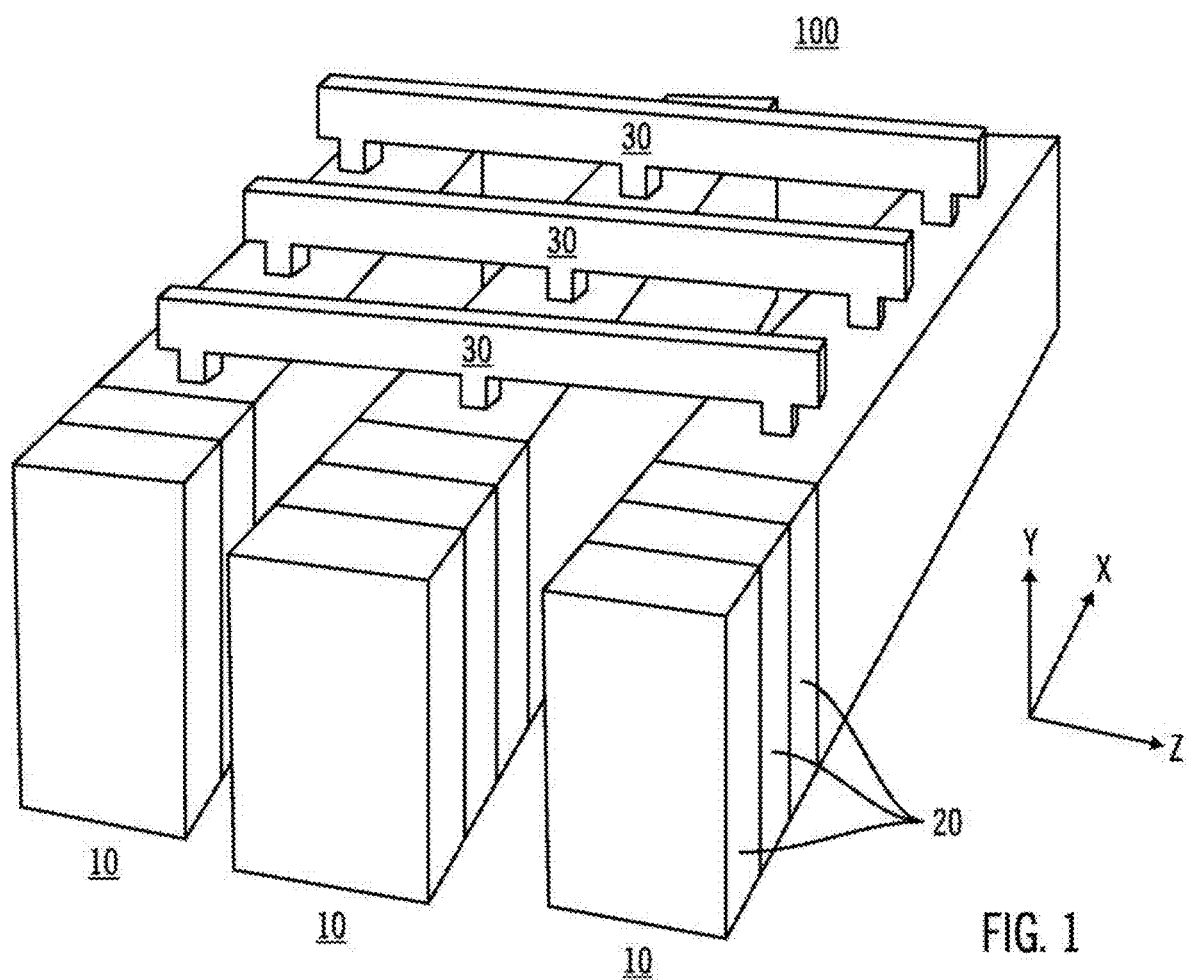
FIG. 1 is a diagram showing the external appearance of the shuttle complex according to one or more embodiments of the present invention.

The following is a description of one or more embodiments of the present description with reference to the drawings. FIG. 1 is a diagram showing the external appearance of the shuttle complex 100. In FIG. 1, the shuttle complex 100 includes three library strings 10, and three shuttle connections 30 arranged on top of the three library strings 10. Each of the library strings 10 includes a plurality of library frames 20 connected in rows in the X direction.

The number of library strings 10 is not limited to three. Any number of library strings can be chosen. The number of shuttle connections 30 is also not limited to three. Any number can be chosen based on the length of the library strings 10 in the X direction. The length of the shuttle connections 30 in the Z direction can be extended as the number of library strings 10 is increased. Cars which move along rails are arranged inside the shuttle connections 30, and storage media, such as tape cartridges, are moved to and from different library strings 10.

Figures 2A, 2B:
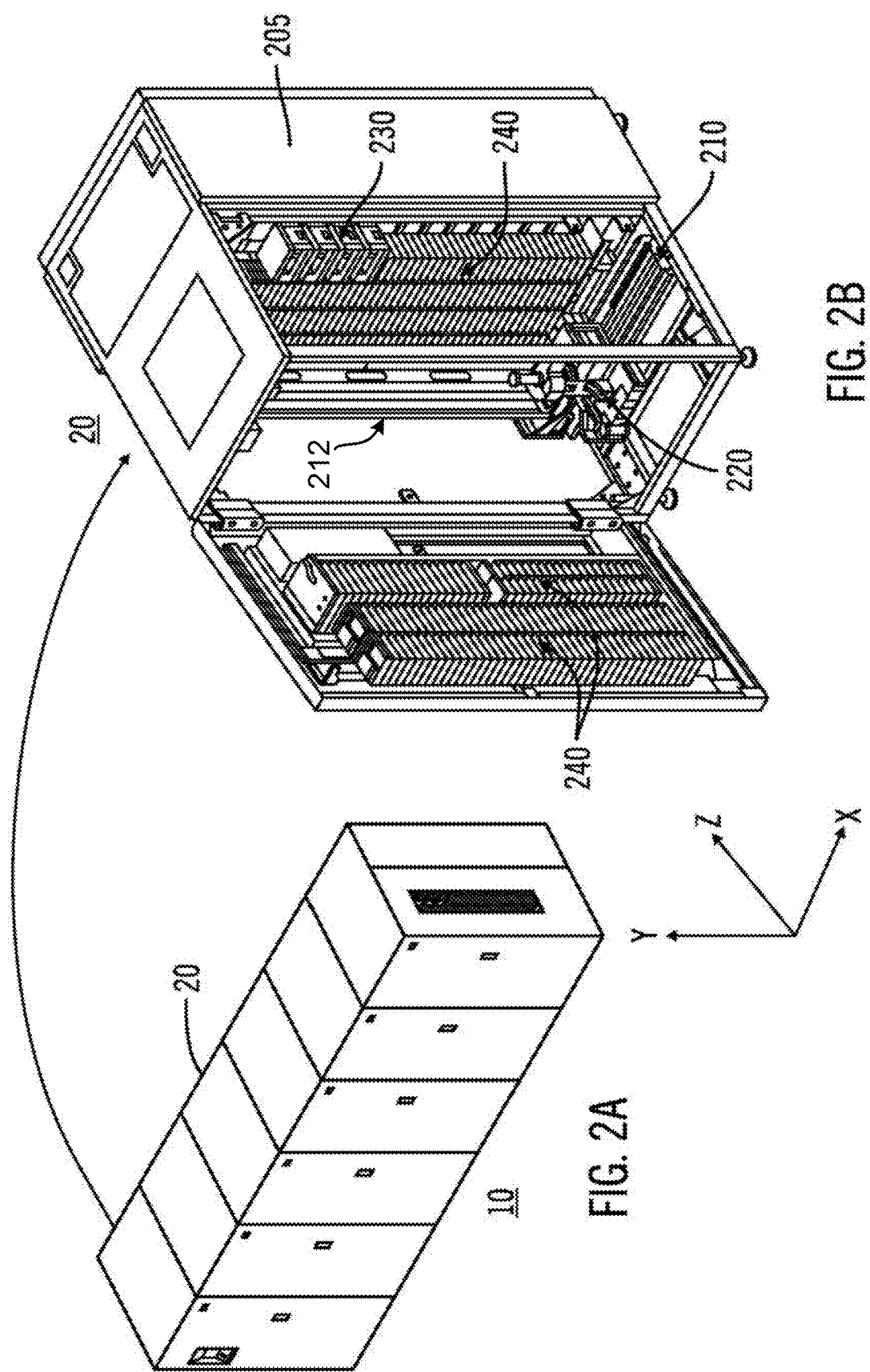
FIG. 2A is a diagram showing exemplary library frames constituting a library string according to one or more embodiments of the present invention.
FIG. 2B is a diagram showing an exemplary library frame according to one or more embodiments of the present invention.

FIG. 2A depicts an exemplary library string 10. The library string 10 includes six connected library frames 20. FIG. 2B depicts a single exemplary library frame 20. The library frame 20 includes, in a housing 205, a robotic arm 220 able to move over a rail 210 in the X direction and over a rail 212 in the Y direction, a plurality of drives 230 for mounting storage media, such as tape cartridges, to retrieve data, and a plurality of slots 240 able to accommodate storage media, herein referred to as cartridge(s).

The rail 210 in the X direction is connected to the rail inside the adjacent library frames 20, and the robotic arm 220 is able to move through multiple connected library frames 20. The robotic arm 220 can hold a cartridge, move at high speed along the rail, and mount the cartridge in the specified drive 230 or slot 240. Any number of drives 230 can be chosen and arranged according to the type of storage medium (magnetic tape, magneto-optical medium, etc.) and the type of cartridge (magnetic tape 3592, LTO, etc.).

Figure 3:
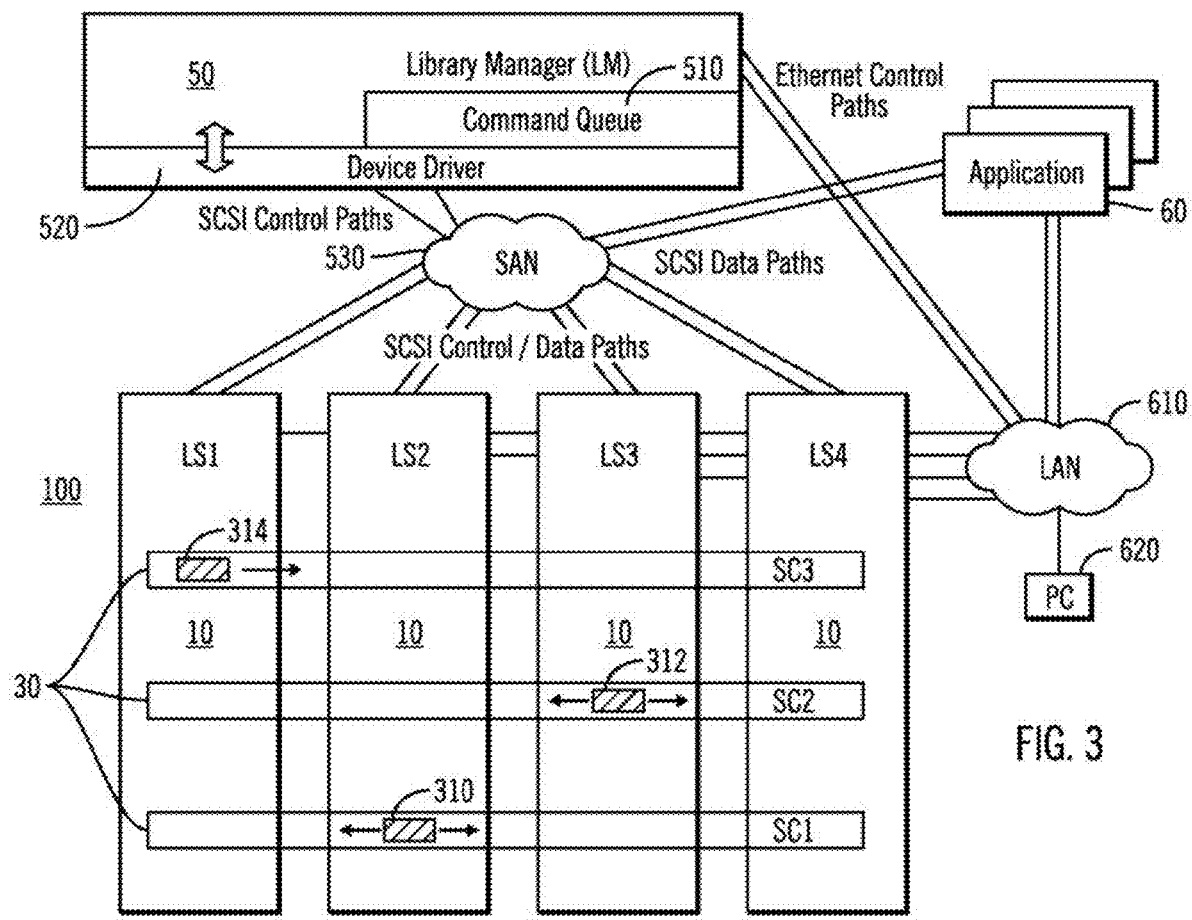
FIG. 3 is a diagram showing a configuration example of a system including a shuttle complex of embodiments of the present invention.

FIG. 3 is a diagram showing a configuration example of a system including a shuttle complex 100 of the present invention. The shuttle complex 100 includes four library strings 10 (LS1-LS4). Three shuttle connections 30 (SC1-SC3) are connected to each library string. A car 310, 312, 314 is provided in each shuttle connection 30 which moves inside the shuttle connection. Each library string 10 and shuttle connection 30 is controlled by a library manager 50 via a storage area network (SAN) 530. The library strings 10 exchange (read/write) data with an application 60 via the SAN 530. The library strings 10 are also able to communicate with the application 60 and each terminal or personal computer (PC) 620 via a local area network (LAN) 610. The application 60 is dedicated software used to mount and unmounts cartridges to and from drives and exchange data therewith. An exemplary application 60 may be IBM Tivoli Storage Manager.

The library manager 50 is a single software package performing virtual central control of the drives 230 and cartridges between the application 60 and the shuttle complex 100 that enables access to each library frame 20. An example of a library manager 50 is a Linear Tape File System (LTFS), such as IBM Spectrum Archive Library Edition, offered by International Business Machines Corporation. The library manager 50 temporarily stores commands from the application 60 in a command queue 510, while controlling device drivers 520, and outputting, for example, a Small Computer System Interface (SCSI) command for each command to applicable library strings 10. The library manager 50 can also be a single software package or single appliance outside of the library, as shown in the drawing, or firmware inside the library.

In an embodiment, application 60 may write to or read from shuttle complex directly. In this embodiment, library manager 50 may be limited to the associated functionality of moving and mounting cartridges, as disclosed herein and application 60 implement the associated functionality of writing to or reading from the shuttle complex 100, as disclosed herein. For example, application 60 may be Tivoli Storage Manager, offered by International Business Machines Corporation and library manager 50 may be IBM Tape System Library Manager, offered by International Business Machines Corporation. In this embodiment, application 60 and/or library manger 50 may communicate to shuttle complex 100 via appropriate protocols (e.g., SCSI, etc.).

In an alternative embodiment, application 60 may write to or read from shuttle complex 100 indirectly through library manager 50. For example, in this embodiment the library manager 50 may be the Linear Tape File System (LTFS) and the application 60 is located e.g., upon a computer 620 that writes to or read from shuttle complex 100 indirectly through the library manager 50. In this embodiment, application 60 may communicate to the library manager 50 via appropriate protocols (e.g., LAN, Network Attached Storage, etc.) and the library manager 50 may communicate to shuttle complex 100 via appropriate protocols (e.g SCSI, etc.).

In a configuration incorporating a library manager 50, the application 60 need only issue a request to library manager 50 when shuttle complex 100 is implicated, and the library manager 50 can manage and allocate the actual cartridges within the shuttle complex 100. In this way, it is easier to share cartridges in the shuttle complex 100 and, because the library manager 50 manages all operations, each application 60 does not have to be aware of the changes each and every time the cartridge configuration of the shuttle complex 100 is altered.

With regard to the movement of a cartridge within shuttle complex 100, in order to move the cartridge within a first library frame 20 to a drive 230 or slot 240 (in the X/Y-axis direction) within the first library frame 20, library manager 50 may issue a SCSI Move Medium command to move the cartridge in a conventional manner. Movement of this cartridge may be performed by robotic arm 220 and the movement speed is relatively fast. In contrast, in order to move (in the Z-axis direction) the cartridge that located in first library frame 20 to a drive 230 or slot 240 of a different second library frame 20 through a shuttle connection 30, more complex options are undertaken and the movement speed is relative slow. The library string 10 that is the movement source of the cartridge and the library string 10 that is the movement destination of the cartridge are described as "movement source string," and "movement destination string," respectively.

Exemplary operations to move (in the Z-axis direction) the cartridge that located in the movement source string to the movement destination string may begin with library manager 50 enumerating all available cars from among all shuttle connections 30 that connect the movement source string and the movement destination string. If there are no cars at the movement source string, library manager 50 may issue a Position to Element command to a car that is nearest the movement source string, to move that car to the movement source string (movement in Z-axis direction).

Library manager 50 may poll the movement source sting and/or the relevant car to confirm the car arrived at the movement source string. Upon detecting that the car arrived at the movement source string, library manager 50 may temporality lock the car so to not allow other car movement operations to proceed until the car delivers the cartridge and is unlocked so as to be available for other cartridge movement operations. The robotic arm 220 associated with the movement source string moves to a particular slot 240 that houses an applicable cartridge, captures the cartridge, moves the captured cartridge to the car, places the cartridge within the car, and moves away from the car to allow the car to move in the Z-axis within shuttle connection 30. For example, library manager 50 issues a Move Media command to robotic arm 220 of the movement source string to move the cartridge from slot 240 to the car (movement in X/Y-axis direction).

Library manager 50 issues an instruction to the car that which houses the cartridge which causes the car to move from the movement source string to the movement destination string (movement in the Z-axis direction). Library manager 50 may poll the destination source sting and/or the relevant car to confirm the car arrived at the destination source string.

The robotic arm 220 associated with the destination source string captures the cartridge, moves the captured cartridge to drive 230, mounts the cartridge within drive 230, and moves away from the drive 230. For example, library manager 50 issues a Move Media command to robotic arm 220 of the movement destination string to move the cartridge from the car to drive 230 (movement in X/Y-axis direction). Library manager 50 may subsequently unlock the car so as to allow the car to be available for further Z-axis cartridge movement operations.

The following is an exemplary implementation of a cartridge moving method of the present invention using the system configuration shown in FIG. 3. First, library manager 50 receives remote mounting command 1 (LS1→LS3) and remote mounting command 2 (LS3→LS1) as commands from application 60, and these commands are placed in the command queue 510. The commands in the command queue 510 may be executed in the order received, so remote mounting command 2 (LS3→LS1) may be executed after remote mounting command 1 (LS1→LS3) has been executed. However, commands in the command queue 510 may be executed simultaneously if cars are available to complete the operations.

Car 1 (310), car 2 (312) and car 3 (314) in respective shuttle connections 30 are positioned, respectively, in LS2, LS3 and LS1 among the library strings 10. The drives 230 are the plurality of drives in each library string 10 and, more specifically, in each library frame 20 of the library string 10.

An available car is searched out in all shuttle connections 30 connecting library strings LS1 and LS3. As a result, car 2 (312) and car 3 (314) are found. The library manager 50 scans the command queue 510 in the order commands were received, and determines whether or not there is a remote mounting command to LS1 which is the departure point and to LS3 with is the departure point. As a result, it finds remote mounting command 1 (LS1→LS3) and remote mounting command 2 (LS3→LS1).

Car 3 (314) is selected, and remote mounting command 1 (LS1→LS3) is executed. In other words, a cartridge CA in LS1 is moved into car 3 (314) (operation S1), and the car 3 (314) carrying the cartridge CA is moved to LS3 (operation S2). When the arrival of car 3 (314) at LS3 is detected, the cartridge CA is moved from car 3 to the specified drive DA (operation S3).

With regard to remote mounting command 2 (LS3→LS1), because car 2 (312) is available (i.e., it is not implicated in remote mounting command 1 (LS1→LS3)), remote mounting command 2 may be executed simultaneous with remote mounting command 1 (LS1→LS3). As such, the specified cartridge CB is moved into car 2 (operation S4), and the car 2 (312) carrying cartridge CB is moved to LS1 (operation S5). When the arrival of car 2 (312) at LS1 is detected, the cartridge CB is moved from car 2 (312) to the specified drive DB (operation S6). Such simultaneous operations can eliminate (or reduce) empty cars traveling between library strings.

The average time required to mount a cartridge in a drive 230 or slot 240 within a library string 10 and between library strings is 8.6 seconds and 37.6 seconds, respectively. In the case of the latter, cars need to travel between library strings 10, so the time required to move a car between library strings is (37.6−(8.6×2))/2=10.2 seconds.

Upon the cartridge being mounted to drive 230, drive 230 may access the mounted cartridge (i.e. read one or more data chunk(s) from storage media of the mounted cartridge and/or write one or more data chunk(s) to the storage media of the cartridge). As such, the term "mounted" is defined herein to be the state in which the cartridge is positioned within a drive such that the drive may read from and/or write to storage media of the cartridge. For example, library manager 50 may issue an access command to the drive to read a data chunk from the cartridge, write a data chunk to the cartridge, or the like. The term "data chunk" is defined herein to be a logical package of data that is stored upon the storage media of the cartridge. A data chunk may therefore be a block, file, page, or the like.

When the drive completes the cartridge access, the cartridge may not immediately dismounted from the drive. Rather, the cartridge is kept in a mounted state within the drive, and if an access of a different cartridge should occur, a different drive is used to mount and access the relevant cartridge. Such a scheme may be beneficial since it has been determined that there is a high probability of successive accesses of a cartridge.

Therefore, when mounting a cartridge, if an unused drive exists (i.e. a drive that which no cartridges are mounted thereto), the unused drive may be utilized to mount the cartridge. However, in a situation where respective cartridges are mounted in all the tape drives, a particular drive may be chosen to dismount the cartridge therefrom based upon a least recently used methodology (i.e., choose a drive for which the longest time period has passed since it's last access). When the existing cartridge is dismounted, a new cartridge to which access has been requested is mounted to the chosen drive and the new cartridge is accessed. Such last recently used methodology may determine which drive has had the longest time period from the last access of the cartridge mounted therein.

However, if the new cartridge must be moved from the movement source string, the last recently used methodology should further consider the time period necessary to move the new cartridge to the movement destination string when choosing the drive to which to dismount the existing cartridge therefrom.

For example, the last recently used methodology may encourage the selection of a drive to which to dismount the existing cartridge therefrom within the same library string 10 that also contains the new cartridge that which access thereto has been requested. More specifically, within the same library string 10, a drive 230 that has not accessed its respective cartridge for a predetermined threshold access-period maybe chosen to dismount the cartridge therefrom so as to mount and access the new cartridge. If there are no drives 230 within the same library string 10 as the new cartridge that which the threshold access-period has elapsed without the respective drive 230 accessing the preexisting cartridge, a tape drive 230 within a different library string 10 is chosen to dismount the preexisting cartridge therefrom so as to mount and access the new cartridge.

Figure 4:
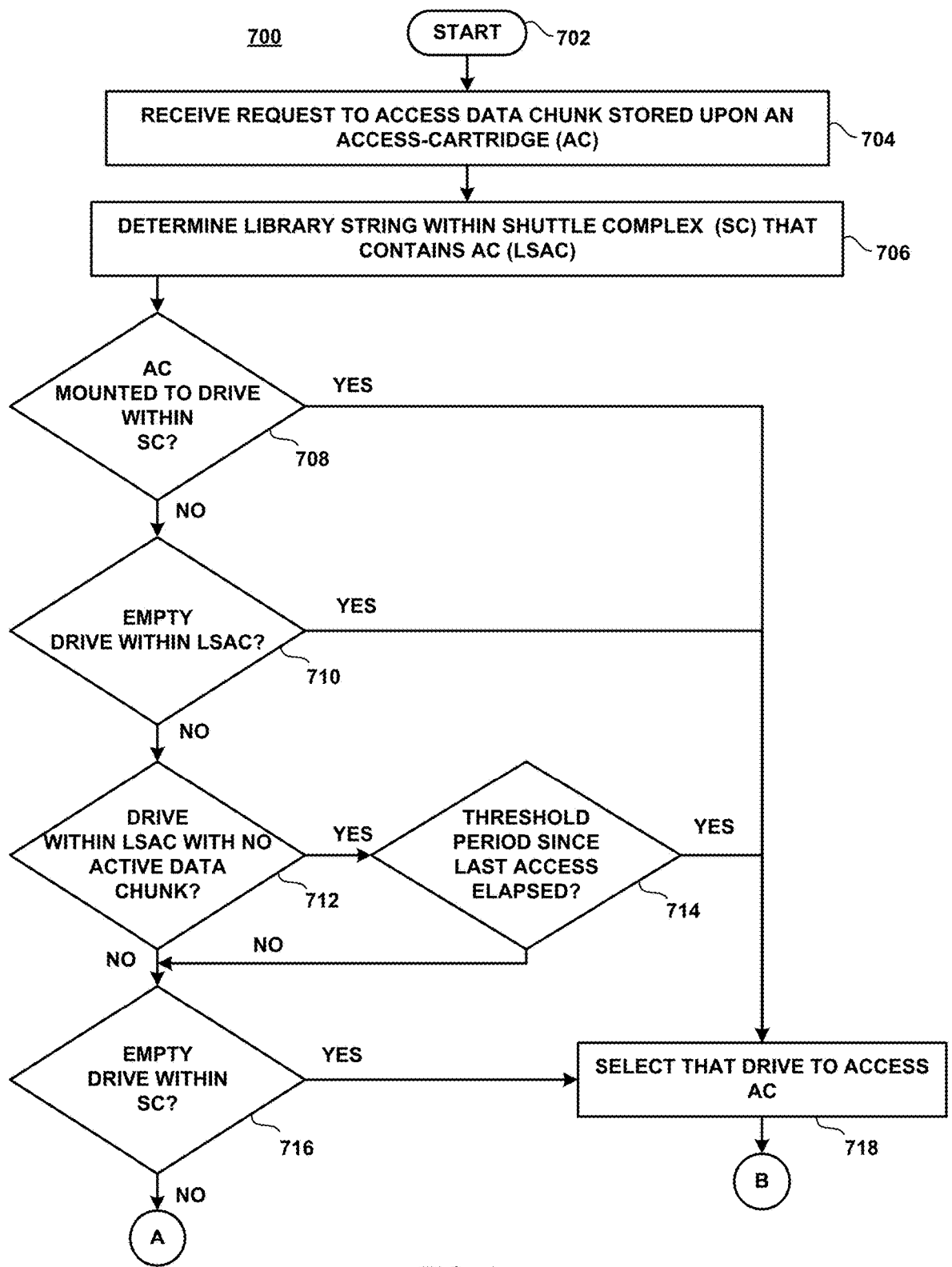
FIG. 4 and FIG. 5 are diagrams showing an exemplary method of moving a cartridge within a shuttle complex according to one or more embodiments of the present invention.
Figure 5:
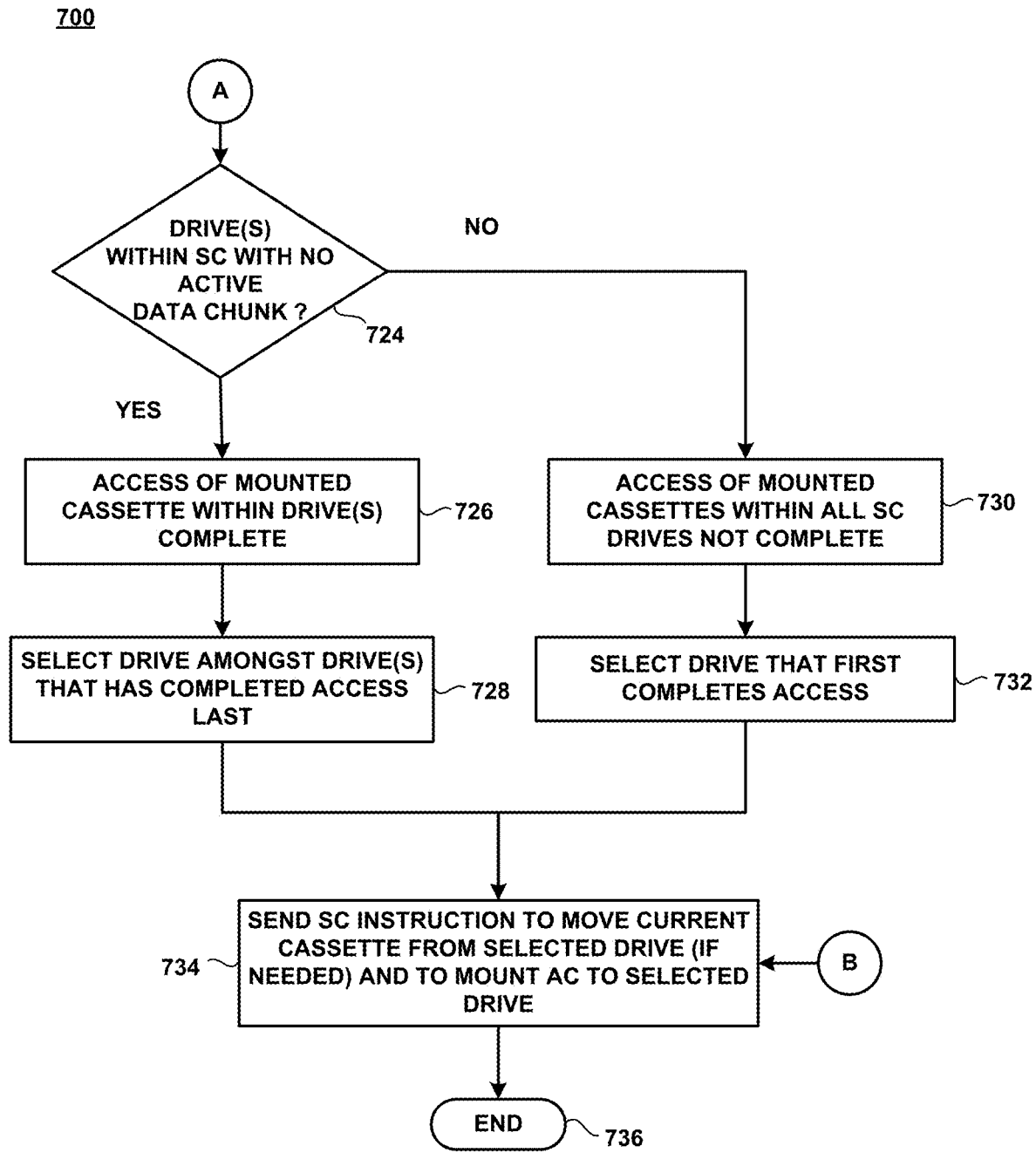

Refer now to FIG. 4 and FIG. 5, which depicts an exemplary method 700 of moving a cartridge within shuttle complex 100 that utilizes a last recently used methodology to encourage the selection of a drive within the same library string 10 that also contains a cartridge that which access thereto has been requested to mount the cartridge. That is, the number of cases which require movement using a car in which, conventionally, it has taken at least 37.6 seconds to mount the cartridge within a destination library sting (movement in the Z-axis) may be reduced and the number of cases in which the cartridge can be mounted in the same library string that contains the cartridge increase. Thus, by implementing method 700, the movement of cartridges in cars of shuttle complex 100 can be decreased.

Method 700 begins at block 702 and continues with receiving a request to access one or more data chunks that are stored upon the storage media of an associated cartridge, hereinafter referred to as the access-cartridge, within shuttle complex 100 (block 704). For example, library manager 50 receives an access request from application 60 so as to result in application 60 reading the data chunk from the access-cartridge and/or so as to result in application 60 write the data chunk to the access-cartridge. The request may include one or more logical addresses which logically identify the access-cartridge. In a particular implementation of method 700, the data chunk is a file and the access-cartridge is a tape cartridge, and the storage media of the tape cartridge is tape.

Method 700 may continue with determining the library string 10, hereinafter referred to as the library string with access cartridge (LSAC), within shuttle complex 100 that which contains the access-cartridge (block 706). In a particular implementation, library manager 50 determines from the access request the particular location of the access-cartridge and the particular LSAC associated therewith. For example, library manager 50 may query the one or more logical addresses included in the access request and determine one or more physical addresses of the access-cartridge by utilizing a logical-to-physical map contained within library manager 50. The one or more physical address may identify the LSAC amongst all of the library strings 10 within complex 100, may identify the particular library frame 20 (LFAC) that contains the access-cartridge amongst all of the library frames 20 within the LSAC, the particular slot 240 that contains the access-cartridge within the LFAC, and/or the particular drive 230 that contains the access-cartridge within the LFAC.

Method 700 may continue with determining whether the access-cartridge is mounted to a drive 230 within the shuttle complex 100 (block 708). In other words, it is determined if the access cartridge is mounted to any drive 230 within the entire shuttle complex 100. For example, library manger 50 may determine from the one or more physical address that the access-cartridge is already mounted in a drive.

Method 700 may continue from block 708 with selecting that drive 230 that which the access-cartridge is already mounted to access the access-cartridge if it is determined the access-cartridge is mounted to a drive 230 within the shuttle complex 100 (block 718). As such, the library manager 50 effectively determines that no movement of the access cartridge in the X, Y, or Z axes is needed to access the access-cartridge since the access-cartridge is already mounted in a particular drive 230 within complex 100.

Method 700 may continue from block 708 if it is determined that the access-cartridge is not mounted to any drives 230 within the shuttle complex 100 by determining whether there is an empty drive 230 within the LSAC (block 710). In other words, it is determined if there are any drives 230 within the LSAC that which have no cartridges mounted or located thereto. For example, library manger 50 may determine from the one or more physical address that the access-cartridge is located in a particular slot 240 within the LSAC and may determine that a particular drive 230 within the LSAC is empty. In various embodiments, the library manger 50 may track activity of each drive 230 within complex 100 with a drive-map data structure (e.g., tracks which drives 230 within complex 100 have a cartridge mounted therein within, which drives 230 are empty, which drives have mounted a cartridge storing an active data chunk thereupon, or the like). The library manager 50 may also track activity of each cartridge within complex 100 with a cartridge-map data structure (e.g., tracks which cartridges are mounted within the drives 230, which cartridges are in route to drives 230 or slots 240, which cartridges are being moved by a particular car or robotic arm, or the like). The drive-map data structure and the cartridge-map data structure may be distinct or integrated data structures stored within a storage media accessible to library manager 50.

Method 700 may continue from block 710 with selecting a drive 230 that is empty and also located in the LSAC if it is determined there is an empty drive 230 within the LSAC (block 718). As such, the library manager 50 effectively determines that movement of the access cartridge in the X axis and/or the Y axis is needed to move the access-cartridge within the LSAC to the empty drive 230 also contained therein. In these circumstances, the library manger may subsequently begin access-cartridge movement and mounting operations (movement in the X axis and/or the Y axis) by sending applicable commands which cause the robotic arm 220 within the LSAC to move and mount the access-cartridge to the empty drive 230 within the LSAC (block 734). Upon being mounted to the drive 230 within the LSAC, the access-cartridge may be accessed.

Method 700 may continue from block 710 with determining whether there is a drive 230 within the LSAC with a cartridge mounted thereto which does not have an active data chunk stored thereupon if it is determined there is not an empty drive 230 within the LSAC (block 712). In other words, it may be determined if there is a drive in which the cartridge mounted thereto contains only inactive data chunks.

The term "active data chunk" is defined herein as a data chunk that is presently being accessed by application 60 or is in a state where the data within the data chunk may be presently altered, edited, or otherwise changed by application 60. Likewise, the similar term "inactive data chunk" is defined herein as a data chunk that is not presently being accessed by application 60 or is not in a state where the data within the data chunk may be presently altered, edited, or otherwise changed by application 60. Thus, if the access of a data chunk is not complete (i.e., there is presently a possibility the data within the data chunk may be changed) that data chunk is an active data chunk and if the access of a data chunk is complete (i.e., there is presently no possibility the data within the data chunk may be changed) that data chunk is an inactive data chunk. For example, a file that has been read by application 60 from a cartridge, via drive 230 and library manager, and is open (i.e., application 60 may edit the file) is an active data chunk. In a particular implementation, therefore, library manger 50 may determine from the drive-map data structure that a particular drive 230 within the LSAC does not have an active data chunk associated therewith. For clarity, an inactive data chunk becomes an active data chunk upon when the state of that data chunk changing to that where the data of that data chunk may be altered, edited, or otherwise changed by application 60.

Method 700 may continue from block 712 by determining whether a predetermined threshold time period has elapsed since the drive 230, within the same LSAC as the access-cartridge, last accessed the cartridge therein mounted, if it was determined that there is a drive 230 within the LSAC without an associated active data chunk therein (block 714). The predetermined time period may be a time period that which a successive access subsequent to the most recent access of the cartridge is not likely (e.g., a time period in which a successive access occurs in less than half of occurrences, less than 90% of occurrences, or the like). In a particular implementation, library manger 50 may determine the time period since the particular drive 230 within the LSAC, without an associated active data chunk therein, last accessed its cartridge mounted therein and compares that time period to the predetermined threshold time period.

Method 700 may continue from block 714 with selecting a drive 230 within the LSAC, which does not have an active data chunk associated therewith, and that which the time period since that drive 230 last accessed its cartridge mounted therein has elapsed the predetermined threshold time period to access the access-cartridge (block 718). In some implementations, if more than one drive 230 has such qualifications, the drive 230 within the LSAC, that does not have an active data chunk associated therewith, and that which most exceeds the predetermined threshold time period since that drive 230 last accessed its cartridge mounted therein is selected to access the access-cartridge.

The library manager 50 may therefore effectively determine whether there is a drive 230 within the LSAC that may be used to access the access-cartridge even when all drives within the LSAC are populated rather than moving the access cartridge to an entirely different library string 10. Such favoring of utilizing a drive 230 within the LSAC may reduce the time needed to access the access-cartridge. In this manner, a particular drive 230 within the LSAC is chosen to dismount the cartridge currently mounted thereto and to subsequently mount and access the access cartridge (block 734). In these circumstances, the library manger 50 may begin cartridge dismounting and movement operations (movement in the X axis and/or the Y axis) to remove the current cartridge mounted within the particular drive 230 by sending applicable commands which cause the robotic arm 220 within the LSAC to dismount and move the cartridge from the drive 230. The library manger 50 may subsequently begin access cartridge movement and mounting operations (movement in the X axis and/or the Y axis) to mount the access-cartridge to the selected drive 230 by sending applicable commands which cause the robotic arm 220 within the LSAC move and mount the access-cartridge to the selected drive 230. Upon being mounted to the drive 230 within the LSAC, the access-cartridge may be accessed.

Method 700 may continue from block 712 by determining whether there is an empty drive within the shuttle complex 100, if it was determined that there are no drives 230 within the LSAC that have mounted thereto a cartridge without an active data chunk stored thereupon (block 716). For example, library manager 50 may determine that all of the drives 230 within the LSAC have mounted thereto a respective cartridge that have one or more active data chunks thereupon and may efficiently determine that the access cartridge should be moved from the LSAC to another library string 10 so that a drive 230 located in such library string 10 may access the access cartridge.

Similarity, method 700 may continue from block 714 by determining whether there is an empty drive within the shuttle complex 100, if it was determined that there was a drive 230 within the LSAC that does have an cartridge mounted thereto without an active data chunk thereupon but the time period of that drive 230 last accessing the cartridge mounted thereto does not exceed the predetermined threshold time period (block 716). For example, library manager 50 may determine one drive 230 within the LSAC had only inactive data chunks thereupon but further determine that the drive 230 has recently accessed the cartridge mounted thereto such that the time since the last access does not exceed the predetermined threshold time period. As such, library manager 50 effectively determines that the access cartridge should be moved from the LSAC to a movement destination string so that a drive 230 located in the movement destination string may access the access cartridge.

Method 700 may continue from block 716 with selecting an empty drive 230 that is not located in the same LSAC as the access-cartridge if it is determined there is an empty drive 230 within the shuttle complex 100 (block 718). As such, the library manager 50 effectively determines that movement of the access cartridge in the Z axis is needed to move the access-cartridge to a movement destination string to the empty drive 230 contained in the movement destination string. In these circumstances, the library manger may subsequently begin access-cartridge movement and mounting operations (movement in the Z axis) by sending applicable commands which cause the robotic arm 220 within the LSAC to move the access-cartridge to the car of the shuttle connection that connects the LSAC and the movement destination string, by sending applicable instructions to the car to move the access-cartridge from the LSAC to the movement destination string, and by sending applicable instructions to the robotic arm 220 within the movement destination string to move the access-cartridge from the car and move and mount the access-cartridge to the empty drive 230 within the movement destination string (block 734). Upon being mounted to the drive 230 within the movement destination string, the access-cartridge may be accessed.

Method 700 may continue from block 716 with determining whether there is a drive 230 within the shuttle complex 100 with a cartridge mounted thereto which does not have an active data chunk stored thereupon if it is determined there is not an empty drive 230 within the shuttle complex 100 (block 724). In other words, it may be determined if there is any drive in the shuttle complex which the cartridge mounted thereto contains only inactive data chunks. For example, library manager 50 determines whether there are any drives 230 within the shuttle complex 100 with a cartridge mounted thereto which does not have an active data chunk stored thereupon if there is no empty drive 230 within the complex 100.

Method 700 may continue from block 724 by determine that the accessing of one or more respective cartridges within one or more drives 230 within complex 100 is complete, if it is determined that there is a drive 230 within the shuttle complex 100 with a cartridge mounted thereto that which does not have an active data chunk stored thereupon (block 726). For example, library manager 50 may determine there is at least one drive 230 in the shuttle complex 100 which the cartridge mounted thereto contains only inactive data chunks and, as such, determines that the accessing of that cartridge by that drive 230 is complete.

Method 700 may continue from block 724 by determining that the accessing of none of the respective cartridges within drives 230 within complex 100 is complete, if it is determined that there are no drives 230 within the shuttle complex 100 with a cartridge mounted thereto that which does not have an active data chunk stored thereupon (block 730). For example, library manager 50 may determine there all of the drives 230 in the shuttle complex 100 have a respective cartridge mounted thereto that contains one or more active data chunks and, as such, determines that the accessing of those cartridges by its associated drive 230 is incomplete.

Method 700 may continue from block 726 with selecting a drive amongst those one or more drives 230 determined in block 726 that most long ago completed its last access of its associated cartridge (block 728). For example, at block 726, library manager 50 may determine there are ten drives 230 in the shuttle complex 100 which the cartridge mounted thereto contains only inactive data chunks and at block 728, library manager 50 may determine that a particular drive of those ten drives 230 most long ago completed its most recent access of the cartridge mounted thereto.

As such, library manager 50 effectively determines that the access cartridge should be moved from the LSAC to a movement destination string so that a drive amongst those one or more drives 230 determined in block 726 that most long ago completed its last access of its associated cartridge located in the movement destination string may access the access cartridge. The library manager 50 may, therefore, determine that movement of the access cartridge in the Z axis is needed to move the access-cartridge to a movement destination string to the drive amongst those one or more drives 230 determined in block 726 that most long ago completed its last access of its associated cartridge contained in the movement destination string. In these circumstances, the library manger 50 may subsequently begin access-cartridge movement and mounting operations (movement in the Z axis) by sending applicable commands which cause the robotic arm 220 within the LSAC to move the access-cartridge to the car of the shuttle connection 30 that connects the LSAC and the movement destination string, by sending applicable instructions to the car to move the access-cartridge from the LSAC to the movement destination string, and by sending applicable instructions to the robotic arm 220 within the movement destination string to move the access-cartridge from the car and move and mount the access-cartridge to the drive amongst those one or more drives 230 determined in block 726 that most long ago completed its last access of its associated cartridge within the movement destination string (block 734). Upon being mounted to the drive amongst those one or more drives 230 determined in block 726 that most long ago completed its last access of its associated cartridge within the movement destination string, the access-cartridge may be accessed.

Method 700 may continue from block 730 with selecting the drive amongst those one or more drives 230 determined in block 730 that first completes all accesses of data chucks stored upon the cartridge mounted thereto (block 732). For example, at block 726, library manager 50 may determine there all drives 230 in the shuttle complex 100 are presently accessing one or more data chucks from respective cartridges mounted thereto and at block 732, library manager 50 may determine monitor such drives 230 and chose a particular drive 230 that first completes all accesses of data chucks stored upon the cartridge mounted thereto.

As such, library manager 50 effectively determines that the access cartridge should be moved from the LSAC to a movement destination string so that a the drive amongst those one or more drives 230 determined in block 730 that first completes all accesses of data chucks stored upon the cartridge mounted thereto located in the movement destination string may access the access cartridge. The library manager 50 may, therefore, determine that movement of the access cartridge in the Z axis is needed to move the access-cartridge to the movement destination string to the drive amongst those one or more drives 230 determined in block 730 that first completes all accesses of data chucks stored upon the cartridge mounted thereto contained in the movement destination string. In these circumstances, the library manger 50 may subsequently begin access-cartridge movement and mounting operations (movement in the Z axis) by sending applicable commands which cause the robotic arm 220 within the LSAC to move the access-cartridge to the car of the shuttle connection 30 that connects the LSAC and the movement destination string, by sending applicable instructions to the car to move the access-cartridge from the LSAC to the movement destination string, and by sending applicable instructions to the robotic arm 220 within the movement destination string to move the access-cartridge from the car and move and mount the access-cartridge to the drive amongst those one or more drives 230 determined in block 730 that first completes all accesses of data chucks stored upon the cartridge mounted thereto within the movement destination string (block 734). Upon being mounted to the drive amongst those one or more drives 230 determined in block 730 that first completes all accesses of data chucks stored upon the cartridge mounted thereto within the movement destination string, the access-cartridge may be accessed.

Method 700 may continue from block 734, by ending at block 736.

Figure 6:
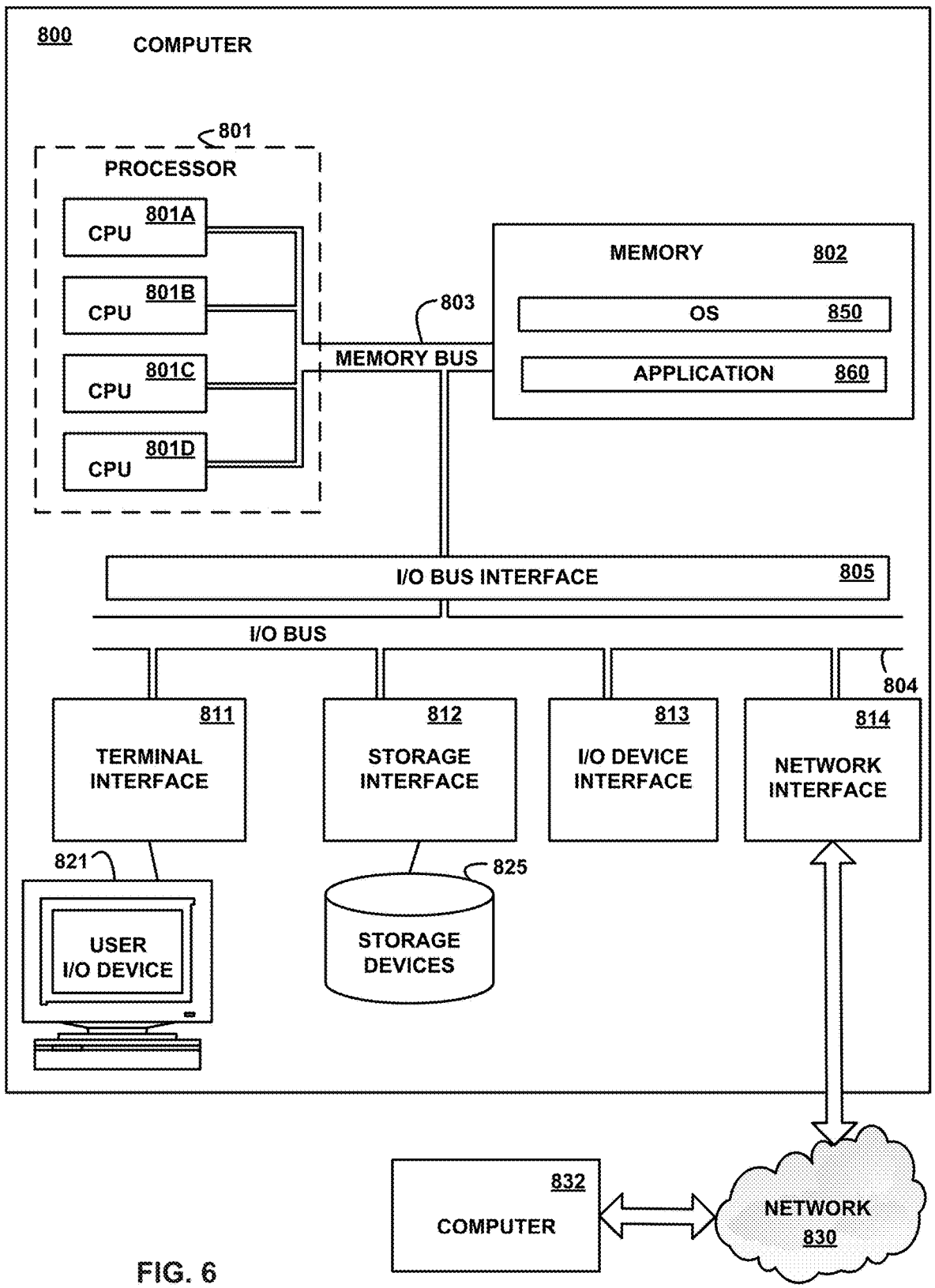
FIG. 6 is a diagram showing an exemplary data handling system which may utilize one or more embodiments of the present invention.

FIG. 6 is a diagram showing an exemplary data handling system which may utilize one or more embodiments of the present invention. More specifically, FIG. 6 depicts a high-level block diagram representation of a computer 800 connected to another computer 832 via a network 830. The term "computer" is used herein for convenience only, and in various embodiments, is a more general electronic data handling devices. The mechanisms and apparatus of embodiments of the present invention apply equally to any appropriate electronic data handling devices.

The major components of the computer 800 may comprise one or more processors 801, a main memory 802, a terminal interface 811, a storage interface 812, an I/O (Input/Output) device interface 813, and a network interface 814, all of which are communicatively coupled, directly or indirectly, for inter-component communication via a memory bus 803, an I/O bus 804, and an I/O bus interface unit 805. The computer 800 contains one or more general-purpose programmable central processing units (CPUs) 801A, 801B, 801C, and 801D, herein generically referred to as the processor 801. In an embodiment, the computer 800 contains multiple processors typical of a relatively large system; however, in another embodiment the computer 800 may alternatively be a single CPU system. Each processor 801 executes instructions stored in the main memory 802 and may comprise one or more levels of on-board cache.

In an embodiment, the main memory 802 may comprise a random-access semiconductor memory, storage device, or other non-tape type storage medium for storing or encoding data and programs. In another embodiment, the main memory 802 represents the entire virtual memory of the computer 800, and may also include the virtual memory of other computer systems coupled to the computer 800 or connected via the network 830. The main memory 802 is conceptually a single monolithic entity, but in other embodiments the main memory 802 is a more complex arrangement, such as a hierarchy of caches and other memory devices. For example, memory 802 may exist in multiple levels of caches, and these caches may be further divided by function, so that one cache holds instructions while another holds non-instruction data, which is used by the processor 801. Memory 802 may be further distributed and associated with different CPUs or sets of CPUs, as is known in any of various so-called non-uniform memory access (NUMA) computer architectures.

The main memory 802 stores or encodes an operating system 850, an application 860, and/or other program instructions. Although the operating system 850, an application 860, etc. are illustrated as being contained within the memory 802 in the computer 800, in other embodiments some or all of them may be on different computer systems and may be accessed remotely, e.g., via a network. The computer 800 may use virtual addressing mechanisms that allow the programs of the computer 800 to behave as if they only have access to a large, single storage entity instead of access to multiple, smaller storage entities. Thus, while operating system 850, application 860, or other program instructions are illustrated as being contained within the main memory 802, these elements are not necessarily all completely contained in the same memory at the same time. Further, although operating system 850, an application 860, other program instructions, etc. are illustrated as being separate entities, in other embodiments some of them, portions of some of them, or all of them may be packaged together.

In an embodiment, operating system 850, application 860, and/or other program instructions comprise instructions or statements that execute on the processor 801 or instructions or statements that are interpreted by instructions or statements that execute on the processor 01, to carry out the functions as further described herein with reference to FIGs. For example, in an embodiment one or more applications 860 may be application 60, library manager 50, or the like. In an embodiment, library manager 50 may be located in computer 800 and application 60 may be located in computer 832.

The memory bus 803 provides a data communication path for transferring data among the processor 801, the main memory 802, and the I/O bus interface unit 805. The I/O bus interface unit 805 is further coupled to the system I/O bus 804 for transferring data to and from the various I/O units. The I/O bus interface unit 805 communicates with multiple I/O interface units 811, 812, 813, and 814, which are also known as I/O processors (IOPs) or I/O adapters (IOAs), through the system I/O bus 804. The I/O interface units support communication with a variety of storage and I/O devices. For example, the terminal interface unit 811 supports the attachment of one or more user I/O devices 821, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 821 and the computer 100, and may receive output data via the user output devices. For example, a user interface may be presented via the user I/O device 821, such as displayed on a display device, played via a speaker, or printed via a printer.

The storage interface unit 812 supports the attachment of one or more storage devices 825. In an embodiment, the storage devices 825 may be rotating magnetic disk drive storage devices, flash storage devices, but in other embodiments they are arrays of disk drives configured to appear as a single large storage device to a host computer, or any other type of storage device. The contents of the main memory 802, or any portion thereof, may be stored to and retrieved from the storage device 825, as needed. The local storage devices 825 have a slower access time than does the memory 802, meaning that the time needed to read and/or write data from/to the memory 802 is less than the time needed to read and/or write data from/to for the local storage devices 825. Similarly, the storage media of the cartridges have a slower access time than does storage devices 825, meaning that the time needed to read and/or write data from/to the storage device 825 is less than the time needed to read and/or write data from/to for the cartridge by the drive 230.

The I/O device interface unit 813 provides an interface to any of various other input/output devices or devices of other types, such as printers or fax machines. The network interface unit 814 provides one or more communications paths from the computer 100 to other data handling devices such as storage system 832; such paths may comprise, e.g., one or more networks 830. Although the memory bus 803 is shown in FIG. 6 as a relatively simple, single bus structure providing a direct communication path among the processors 801, the main memory 802, and the I/O bus interface 805, in fact the memory bus 803 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 805 and the I/O bus 804 are shown as single respective units, the computer 800 may, in fact, contain multiple I/O bus interface units 805 and/or multiple I/O buses 804. While multiple I/O interface units are shown, which separate the system I/O bus 804 from various communications paths running to the various I/O devices, in other embodiments some or all of the I/O devices are connected directly to one or more system I/O buses.

I/O interface unit 813 and/or network interface 814 may contain electronic components and logic to adapt or convert data of one protocol on I/O bus 804 to another protocol on another bus. Therefore, I/O interface unit 813 and/or network interface 814 may connect a wide variety of devices to computer 800 and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc. In a particular embodiment, the computer 800 may be connected to shuttle complex 100 via I/O interface unit 813 and/or network interface 814.

Though shown as distinct entities, the multiple I/O interface units 811, 812, 813, and 814 or the functionality of the I/O interface units 811, 812, 813, and 814 may be integrated into the same component. In various embodiments, the computer 800 is a multi-user mainframe computer system, a single-user system, a storage server, or a server computer or similar device that has little or no direct user interface, but receives requests from other computer systems (clients). In other embodiments, the computer 800 is implemented as a desktop computer, portable computer, laptop or notebook computer, tablet computer, pocket computer, telephone, smart phone, pager, automobile, teleconferencing system, appliance, or any other appropriate type of electronic device.

A communication network 830 may connect the computer 800 to another computer 832 and be any suitable communication network or combination of networks and may support any appropriate protocol suitable for communication of data and/or code to/from the computer 800. In various embodiments, the communication network 830 may represent a data handling device or a combination of data handling devices, either connected directly or indirectly to the computer 800. In another embodiment, the communication network 830 may support wireless communications. In another embodiment, the communication network 830 may support hard-wired communications, such as a telephone line or cable. In another embodiment, the communication network 830 may be the Internet and may support IP (Internet Protocol). In another embodiment, the communication network 830 is implemented as a local area network (LAN) or a wide area network (WAN). In another embodiment, the communication network 830 is implemented as a hotspot service provider network. In another embodiment, the communication network 830 is implemented an intranet. In another embodiment, the communication network 830 is implemented as any appropriate cellular data network, cell-based radio network technology, or wireless network. In another embodiment, the communication network 830 is implemented as any suitable network or combination of networks.

A storage network that may connect the computer 800 with shuttle complex 100 (not shown) is a storage area network (SAN), which is a network which provides access to consolidated, block level data storage. The SAN is generally any high-performance network whose primary purpose is to enable shuttle complex 100 to provide block level storage operations to computer 800. The SAN may be primarily used to enhance storage devices, such as disk arrays, tape libraries, optical jukeboxes, etc., within the storage system to be accessible to computer 100 so that the storage appear to the operating system 850 as locally attached devices. In other words, the storage system may appear to the OS 150 as being storage device 125. A benefit of the SAN is that raw storage is treated as a pool of resources that can be centrally managed and allocated on an as-needed basis. Further, the SAN may be highly scalable because additional storage capacity can be added as required.

The SAN may include may include multiple shuttle complexes 100. Application 860 and/or OS 850 of multiple computers can be connected to multiple shuttle complexes 100 via the SAN. For example, any application 860 and or OS 850 running on each computer can access shared or distinct block level storage within the collective multiple shuttle complexes 100. When computer 800 wants to access a cartridge within shuttle complex 100 via the SAN, computer 800 sends out a block-based access request for the storage device. The SAN may further include cabling, host bus adapters (HBAs), and switches. Each switch on the SAN may be interconnected and the interconnections generally support bandwidth levels that can adequately handle peak data activities. The SAN may be a Fibre Channel SAN, iSCSI SAN, or the like.

FIG. 6 is intended to depict representative major components of the computer 800. Individual components may have greater complexity than represented in FIG. 6, components other than or in addition to those shown in FIG. 6 may be present, and the number, type, and configuration of such components may vary. Several particular examples of such additional complexity or additional variations are disclosed herein; these are by way of example only and are not necessarily the only such variations. The various program instructions implementing e.g. upon computer system 800 according to various embodiments of the invention may be implemented in a number of manners, including using various computer applications, routines, components, programs, objects, modules, data structures, etc., and are referred to hereinafter as "computer programs," or simply "programs."

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the examples described above, a cartridge that is moved within shuttle connection 30 that was previously mounted in a slot and moved to another library string 10 and mounted in a drive. However, the locations may be reversed such that the cartridge may be moved from a drive via shuttle connection 30 to another library string 10 and placed within a slot. It is also contemplated that one or more cartridges may be moved from a slot via shuttle connection 30 to another library string 10 and placed within a slot and is even further contemplated that one or more cartridge may be moved from a drive via shuttle connection 30 to another library string 10 and placed within a drive.

Embodiments in accordance with the present description were explained with reference to the drawings. However, the present invention is not limited to these embodiments. Cartridge moving in accordance with the present description can be embodied in a manner that includes various improvements, modifications and variations based on the knowledge of those skilled in the art without departing from the scope of the description provided herein.

What is claimed is:

1. A system, comprising:
a shuttle complex comprising a plurality of shuttle connections, each shuttle connection having a car able to move within the shuttle connection, and a plurality of library strings connected by at least one shuttle connection, each library string comprising at least one cartridge including a storage medium;
a library string comprising an access-cartridge (LSAC);
a local drive amongst a plurality of local drives within the LSAC that has a second cartridge mounted therein which comprises only inactive data chunks;
a first robotic arm within the LSAC that removes the second cartridge from the local drive within the LSAC and mounts the access-cartridge to the local drive within the LSAC, if an elapsed time since the local drive within the LSAC most recently accessed the second cartridge exceeds a predetermined time period threshold;
an LSR-LSAC shuttle connection that moves the access-cartridge from the LSAC to a remote library string comprising a remove drive (LSR), if the elapsed time since the local drive within the LSAC most recently accessed the second cartridge does not exceed the predetermined time period threshold; and
a second robotic arm within the LSR that mounts the access-cartridge to the remote drive within the LSR.

2. A The system of claim 1, wherein the access-cartridge is located within a slot of the LSAC prior to the first robotic arm mounting the access-cartridge to the local drive within the LSAC.

3. A The system of claim 1, wherein the access-cartridge is a tape cartridge and wherein each of the plurality of library strings includes a plurality of tape drives for accessing a tape cartridge, and a plurality of slots for accommodating a tape cartridge.

4. A The system of claim 1, wherein the robotic arm moves the second cartridge from the drive within the LSAC to a first slot within the LSAC and moves the access-cartridge from a second slot within the LSAC to the drive within the LSAC.

5. A The system of claim 1, wherein the predetermined time period threshold is a time period such that a subsequent access of a cartridge after the cartridge was most recently accessed occurs in less than half of access occurrences.

6. A The system of claim 1, wherein the predetermined time period threshold is a time period such that a subsequent access of a cartridge after the cartridge was most recently accessed occurs in less than ninety percent of access occurrences.

* * * * *